United States Patent [19]
Oppelt

[11] Patent Number: 6,074,346
[45] Date of Patent: Jun. 13, 2000

[54] TRANSMIT/RECEIVE ULTRASOUND FRONT END CIRCUIT PROVIDING AUTOMATIC TRANSMIT/RECEIVE SWITCHING

[75] Inventor: Ralph Oppelt, Uttenreuth, Germany

[73] Assignee: Siemens Medical Systems, Inc., Iselin, N.J.

[21] Appl. No.: 08/883,779

[22] Filed: Jun. 27, 1997

[51] Int. Cl.[7] ........................................ A61B 8/00
[52] U.S. Cl. ................................................ 600/437
[58] Field of Search ........................ 600/455, 437, 600/463, 462; 367/7, 138, 87; 310/316, 317; 326/56; 331/116 R

[56] References Cited

U.S. PATENT DOCUMENTS

| | | | |
|---|---|---|---|
| 3,596,206 | 7/1971 | Loria et al. | 331/116 R |
| 4,223,242 | 9/1980 | Redlich et al. | 310/316 |
| 4,376,900 | 3/1983 | Metzger | 326/56 |
| 4,701,893 | 10/1987 | Muller et al. | 367/87 |
| 4,819,652 | 4/1989 | Micco | 600/455 |
| 4,975,885 | 12/1990 | Hassler et al. . | |
| 5,603,324 | 2/1997 | Oppelt et al. | 600/437 |
| 5,609,154 | 3/1997 | Oppelt et al. . | |
| 5,825,117 | 10/1998 | Ossmann et al. | 310/317 |

FOREIGN PATENT DOCUMENTS

3301967 A1  7/1984  Germany .

*Primary Examiner*—Marvin M. Lateef
*Assistant Examiner*—Ali M. Imam

[57] ABSTRACT

A transmit/receive circuit employing passive elements. A transmit/receive circuit according to an embodiment of the present invention includes a transformer having a primary winding coupled to an input stage and an output stage. A transducer is coupled to the secondary winding of the transformer. A diode limiter is coupled to the input stage and a diode bridge is coupled to a node at the output stage. The input and output stages are alternatingly grounded. An output switch including an inverse parallel circuit of two diodes having opposite polarities may be connected at the output stage between a transmitter and the transformer. Alternatively, a complementary common emitter amplifier may be provided at the output stage. The circuit thus electrically couples the transducer element to the receiver during reception and electrically decouples both the transducer and the transmitter from the receiver during transmission. The circuit further electrically couples the transducer to the transmitter during transmission and electrically decouples both the transducer element and the receiver from the transmitter during reception.

35 Claims, 12 Drawing Sheets

FIG. 13

TRANSMIT/RECEIVE ULTRASOUND FRONT END CIRCUIT PROVIDING AUTOMATIC TRANSMIT/RECEIVE SWITCHING

BACKGROUND OF THE INVENTION

1. Field of the Invention

The present invention relates to ultrasound imaging and, more particularly, to a transmit/receive circuit for an ultrasound imaging device.

2. Description of the Related Art

Ultrasound imaging systems generally operate according to a "pulse-echo method." Such systems must be capable of alternately transmitting and receiving. When transmitting, one or more piezoelectric transducer elements, for example arranged in a linear or two-dimensional array, are excited to high-frequency oscillation by electrical pulses emitted by a transmitter, thereby generating an ultrasound pulse that may be directed at an object to be imaged. This ultrasound pulse is echoed back towards the transducer from some point within the object; for example, at boundary layers between two media with differing acoustic impedances.

Then, when receiving, the "echo pulse" is received by the transducer element and converted into a corresponding electrical input signal (i.e., the "echo signal") that is fed to a receiver equipped with sensitive preamplifiers for enhancing the signal. The amplified signal may then be fed to a signal processor for evaluating the echoed image data to generate a visual image.

The transmit pulse and the echo pulse must be separated from one another for the transmit and receive conditions of the ultrasound imaging system to operate effectively. To this end, a transmit/receive circuit is associated with each transducer element in the ultrasound imaging system. Each transmit/receive circuit selectively connects a respective transducer element to either the transmitter or the receiver, depending on whether the transducer element is operating in the transmit mode or the receive mode.

Decoupling the transmitter from the receiver is principally desirable because of the differing amplitudes of the transmitted and received signals. For instance, the transmit pulses used to excite the transducer elements have comparably high voltage amplitudes, typically greater than 100 Volts. On the other hand, the received echo signals are comparatively weak, requiring amplification by sensitive preamplifiers in the receiver. The input stage must therefore electrically decouple the receiver from the transmitter during the transmission to protect the preamplifiers from being damaged by the strong transmit pulses coming from the transmitter. Decoupling the receiver from the transmitter is also desirable during receiving to prevent noise generated by the transmitter from disrupting the signals input to the receiver. Similarly, decoupling the transmitter from the receiver is desirable during transmitting to prevent the receiver from reacting to the transmitter in a manner that might disrupt or distort the shape of the transmit pulse.

Various transmit/receive circuits are known. Such circuits are known to be active (i.e., controlled by a switching signal) or passive (i.e., function automatically). Active transmit/receive circuit circuits are generally realized by various kinds of active devices such as transistors, which vary their properties as a function of the potential or current applied on their control inputs. Such active circuits are disadvantageous in that a separate control line must be provided to each such circuit in the ultrasound device. Obviously, the control signals must be provided by additional control circuitry which must synchronize application of the control signals to the transmit receive cycle. If the synchronization fails, damage to the receivers may result. While passive implementations are known, such passive circuits are generally limited in their dynamic range.

Accordingly, there is a need for a transmit receiver input stage that is both automatic and has a broad dynamic range.

SUMMARY OF THE INVENTION

These and other drawbacks in the prior art are overcome in large part by a transmit/receive circuit employing passive elements according to the present invention. A transmit/receive circuit according to the present invention includes a transducer coupled between an output stage and an input stage. A non-linear impedance is coupled to a node intercoupling the transducer and the input stage. An output node of the transducer is maintained at zero potential after transmission. The impedance has a high dynamic resistance for low voltages and a low dynamic resistance for high voltages. In one embodiment, the non-linear impedance includes a pair of diodes connected in anti-parallel fashion.

A transmit/receive circuit according to an embodiment of the present invention includes a transformer having a first winding coupled to an input stage and an output stage. A transducer is coupled to the second winding of the transformer. A diode limiter is coupled to the input stage and a diode bridge is coupled to a node at the output stage. The circuit's input and output nodes are alternatingly grounded. An output switch including an inverse parallel circuit of two diodes having opposite polarities may be connected at the output stage between a transmitter and the transformer. Alternatively, a complementary common emitter amplifier may be provided at the output stage. The circuit thus electrically couples the transducer element to the receiver during reception and electrically decouples both the transducer and the transmitter from the receiver during transmission. The circuit further electrically couples the transducer to the transmitter during transmission and electrically decouples both the transducer element and the receiver from the transmitter during reception.

BRIEF DESCRIPTION OF THE DRAWINGS

FIG. 2b is a diagram of an idealized current/voltage characteristic of a non-linear impedance of FIG. 2a.

FIG. 3b is a diagram of an idealized current/voltage characteristic of a nonlinear impedance of FIG. 3a;

DETAILED DESCRIPTION OF THE INVENTION

Figure 1:
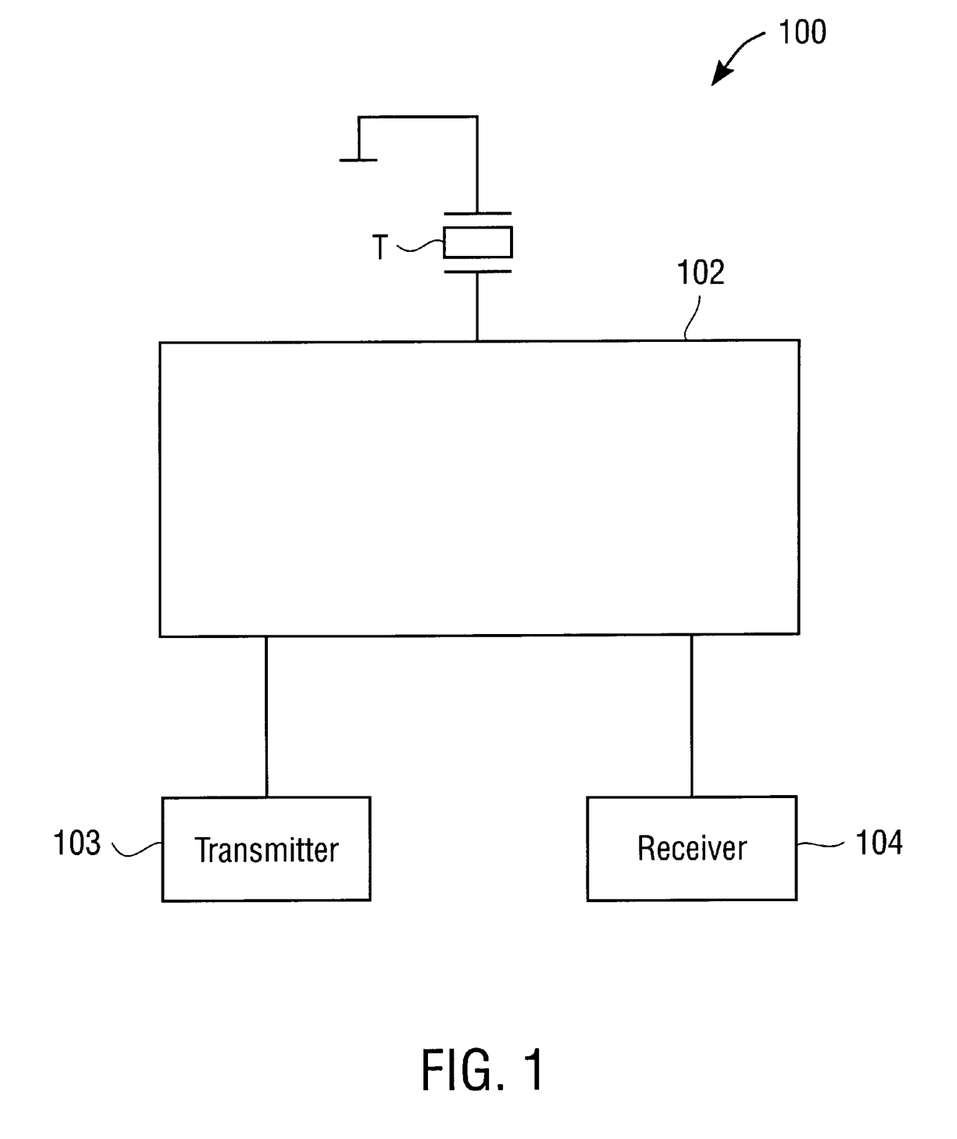
FIG. 1 is a block diagram of an ultrasound imaging system according to one embodiment of the present invention.

Referring now to the drawings, and with particular attention to FIG. 1, an ultrasound imaging system according to one embodiment of the present invention includes one or more ultrasound transducer elements T. The ultrasound imaging system is capable of selectively transmitting and receiving. When transmitting, a transmitter 103 triggers the transducer element T with transmit pulses; while receiving, a receiver 104 is used to evaluate echo signals received by the transducer element T. A transmit/receive circuit 102 facilitates switching between transmission and reception, electrically connecting the transducer element T to the transmitter 103 during transmission, or to the receiver 104 during reception.

During transmission, an object (not shown) to be imaged will be irradiated with ultrasonic pulses from the transducer element T. To accomplish this, the transmitter 103 emits transmit pulses sufficient to excite the transducer element T to ultrasound oscillation. The ON duration of a single transmit pulse can generally be selected to be between 50 ns and 500 ns, and in one embodiment is about 150 ns; and the pulse height (i.e., amplitude) of the transmit pulses may be between 50 and 150 V.

A variety of piezoelectric transducer elements may be used in such an imaging system, such as piezoceramic elements. The transducer element T may be part of an ultrasound array (not shown) including a plurality of transducer elements. Such an array may be a linear array or a two-dimensional array, such as a matrix-type array. Arrays of this type are generally integrated in a substrate through microstructuring.

In an embodiment of the present invention using a transducer array, a transmit/receive circuit may be associated with each transducer element of the array, with the transmit/receive circuit preferably integrated with the array in the substrate. All transducer elements of the array are driven by a single transmitter, using a phase lag, for example, to generate a directed ultrasound beam, which may be electronically directed at different parts of the object to be imaged. By contrast, in the embodiment with only a single transducer element T the object to be imaged may be mechanically scanned by physically moving the transducer element T.

When receiving, ultrasound signals are reflected back from the object to the transducer element T (or an array of transducer elements T) as echo pulses. The transducer element T converts these echo pulses into electrical signals (i.e., echo signals) that are then fed by the transmit/receive circuit 102 to an input of the receiver 104. In the receiver 104, the input signals are preferably amplified and then fed to a signal processor (not shown) for evaluating the image information.

The transmit/receive circuit 102 will be discussed in greater detail below. Briefly, the transmit/receive circuit 102 is configured to electrically connect the transducer element T to the receiver 104 when the imaging system is receiving the echo signal. The transmit/receive circuit 102 is also used for electrically decoupling both the transducer element T and the transmitter 103 from the receiver 104 during transmission. The transmit/receive circuit 102 further is used to electrically connect the transducer element T to the transmitter 103 when the imaging system is transmitting, and to electrically decouple both the transducer element T and the receiver 104 from the transmitter 103 when the imaging system is receiving.

Figure 2A:
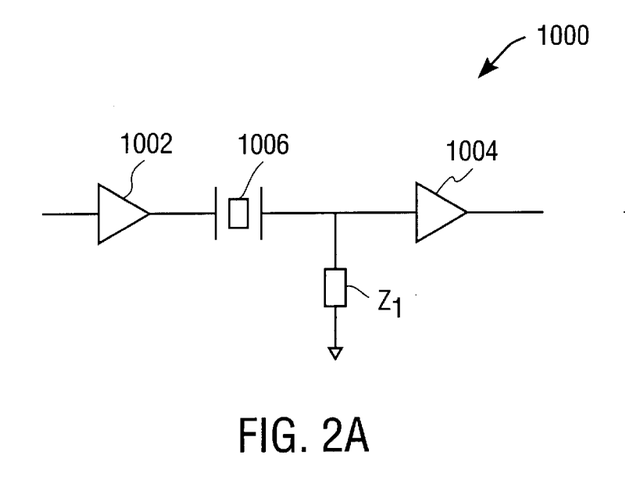
FIG. 2a is a diagram of an ultrasound transmit/receive circuit according to an embodiment of the present invention.
Figure 2B:
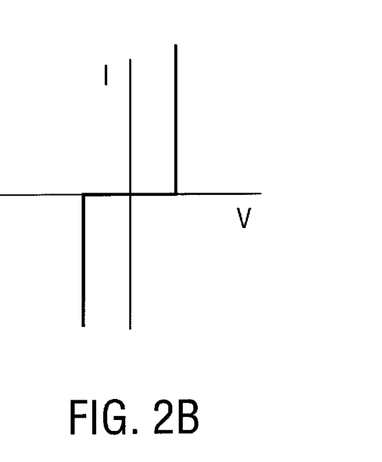

Turning now to FIG. 2a, a diagram of an exemplary transmit/receive circuit according to the present invention is shown. The transmit/receive circuit 1000 includes a low-impedance transmit stage 1002 and a receive stage 1004. A transducer 1006 is coupled between the transmit stage 1002 and the receive stage 1004. A non-linear impedance Z1 is coupled to a node connecting the transducer 1006 and the receive stage 1004. An idealized characteristic for the non-linear impedance Z1 is shown in FIG. 2b. The voltage thresholds are low and, in particular in one embodiment, the voltage thresholds are about +/–1 V. The non-linear impedance Z1 has a high dynamic resistance for low voltages and a low dynamic resistance for high voltages. In one embodiment, the non-linear impedance Z1 is embodied in a pair of diodes connected anti-parallel.

Figure 3A:
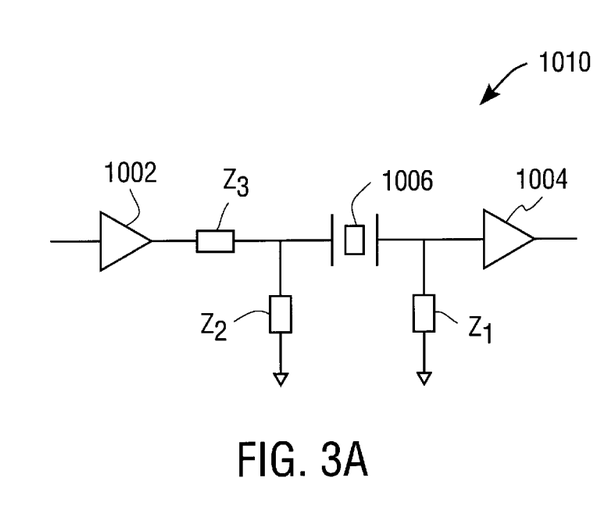
FIG. 3a is a diagram of an ultrasound transmit/receive circuit according to another embodiment of the present invention.
Figure 3B:
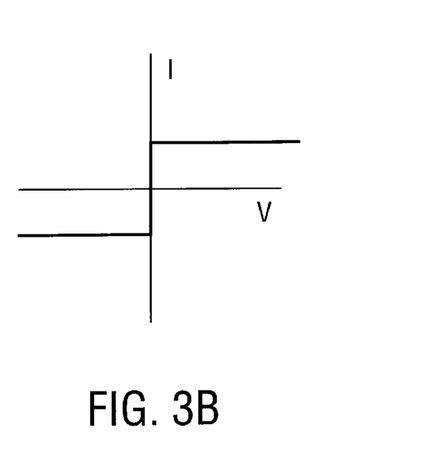

FIG. 3a illustrates another embodiment of a transmit/receive circuit 1010 according to the present invention. For sake of clarity, like components will retain the same reference numerals as in FIG. 2a. Circuit 1010 is similar to that in FIG. 2a, except that an additional pair of non-linear impedances Z2 and Z3 are introduced between the transmit stage 1002 and the transducer 1006. The transmit stage may be a high impedance device during receive operation and may introduce noise. The additional non-linear impedances Z2 and Z3 correct for this. The non-linear impedance Z3 has a characteristic that is similar to the characteristic for Z1. The characteristic for Z2 is illustrated in FIG. 3b. It is similar to that for Z1, except that it is mirrored on a 45 degree axis. The Z2 impedance may be embodied in a diode bridge with a current source, as will be described below. Other embodiments, such as bipolar transistors driven in saturation, are contemplated.

Figure 4A:
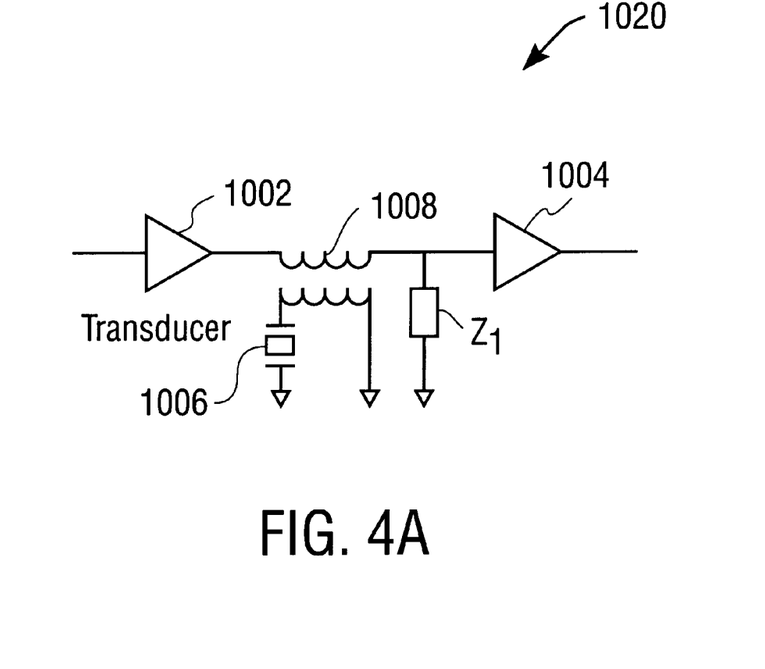
FIG. 4a is a diagram of an ultrasound transmit/receive circuit according to another embodiment of the present invention.
Figure 4B:
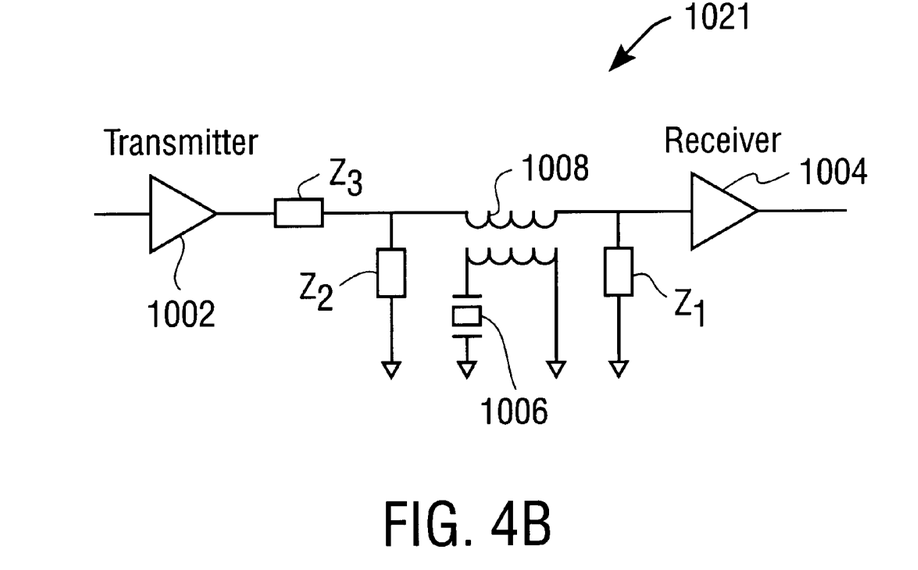
FIG. 4b is a diagram of an ultrasound transmit/receive apparatus according to another embodiment of the present invention.

Turning now to FIG. 4a, yet another embodiment of the present invention is illustrated. Transmit/receive circuit 1020 is similar to that in FIG. 2a, except that a transformer 1008 is introduced between the transmit stage 1002 and the receive stage 1004 for better isolating the transducer 1006, which is no longer floating. The circuit 1020 accounts for typical practice, in which transducers in transducer arrays have a common ground. It is noted, however, that floating transducers are contemplated, as described above. An embodiment of the invention as illustrated in FIG. 4b is similar to circuit 1020 of FIG. 4a, but includes the non-linear impedances Z2 and Z3 of FIG. 3a.

Figure 5A:
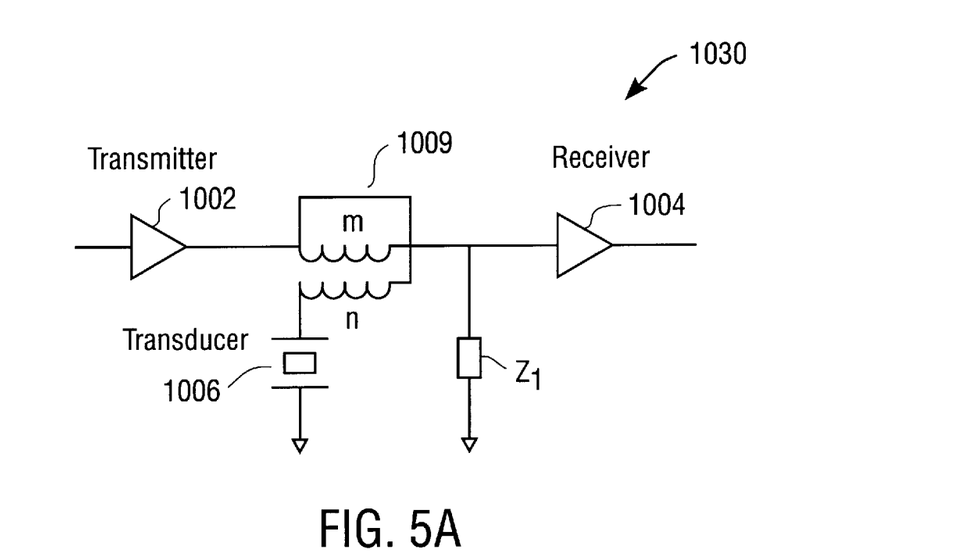
FIG. 5a is a diagram of an ultrasound transmit/receive circuit according to another embodiment of the present invention.
Figure 5B:
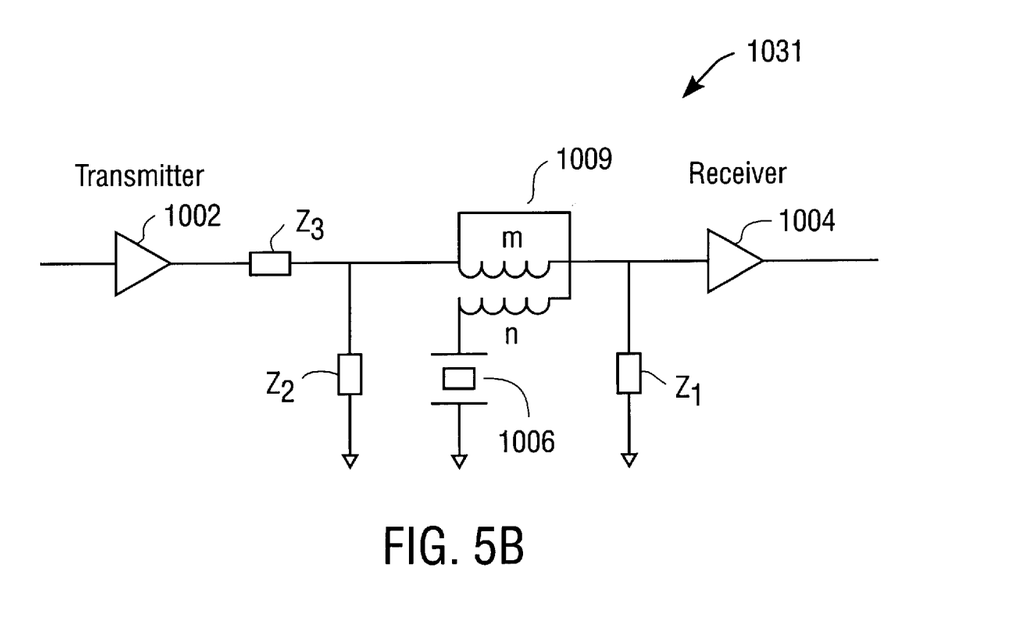
FIG. 5b is a diagram of an ultrasound transmit/receive circuit according to another embodiment of the present invention.

FIG. 5a illustrates an exemplary transmit/receive circuit 1030 of the type illustrated in FIG. 4a. It is basically the same, except that the transformer 1008 has been replaced with an auto-transformer 1009. The auto-transformer 1008 has m turns on the primary side and n turns on the secondary side. Thus, during transmit, an m:(m+n) step-up ratio occurs, and during receive, a −n:m ratio occurs. Thus, for example, if n=m, a 1:2 step-up occurs during transmit, and the −1:1 ratio during receive maintains the transducer impedance at a relatively high level. Thus, different transforming ratios may be obtained during transmit and receive. The circuit 1031 of FIG. 5b is similar except that, again, non-linear impedances Z2 and Z3 are provided.

Figure 6:
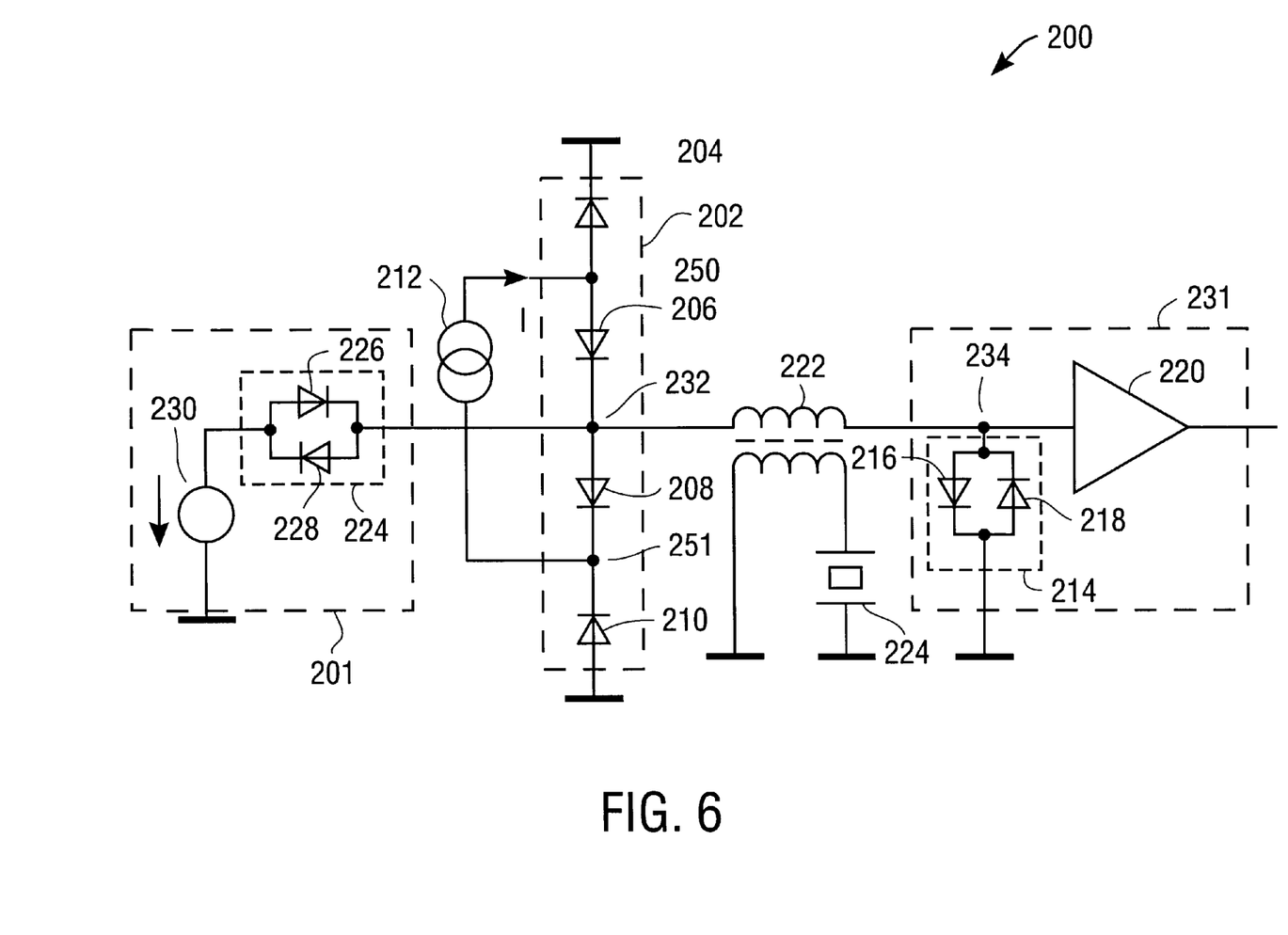
FIG. 6 is a diagram of an exemplary embodiment of the transmit/receive circuit of FIGS. 4b.
Figure 7A:
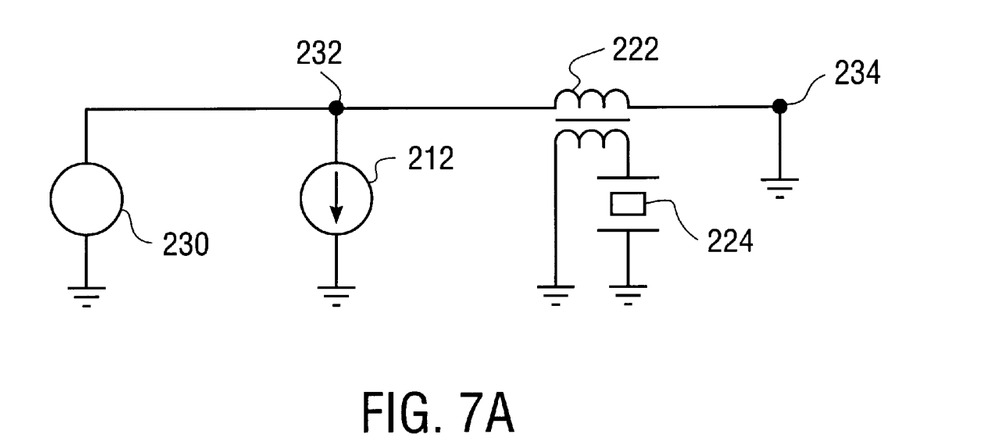
FIG. 7a and FIG. 7b are equivalent circuits of the transmit and receive operation of the transmit/receive circuit of FIG. 6.
Figure 7B:
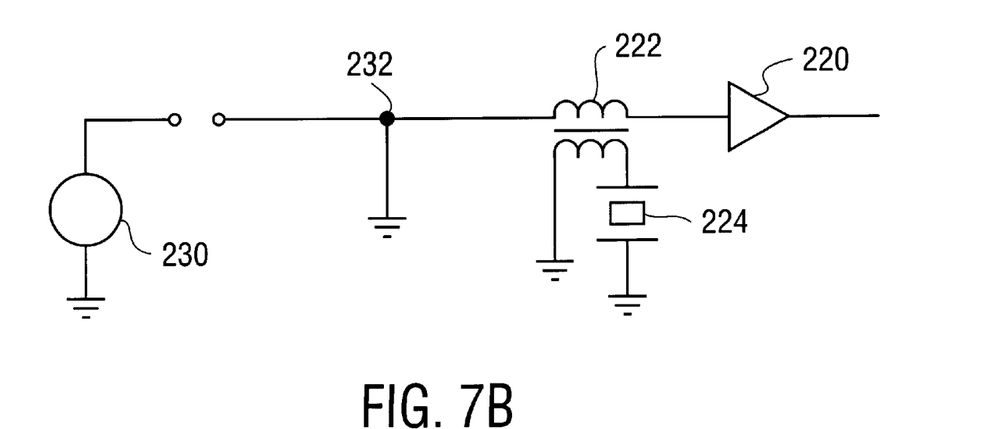

Turning now to FIG. 6 and FIGS. 7a and 7b, a diagram illustrating an unbalanced-to-ground circuit according to an embodiment of the present invention is illustrated. The circuit 200 includes a transmit output stage 201 coupled to a node 232 which in turn is coupled to a primary winding of a transformer 222. The secondary winding of the transformer 222 is coupled to one or more transducers 224. The primary winding of the transformer 222 is further coupled to a receiver stage 231 at a node 234. As noted above, the transformer may be omitted in embodiments employing floating transducers. Further, the transformer may be a step-up transformer, or an auto-transformer, as described above.

The receiver stage 231 includes a diode limiter circuit 214, embodying the non-linear impedance Z1, and a receiver preamplifier 220. The transmit output stage 201 includes a signal source 230 and a transmit switch 224 which embodies the impedance Z3. The transmit switch 224 includes an inverse parallel circuit of two diodes 226, 228 having opposite polarities connected between the transmit signal source 230 and node 232. The transmit output stage 201 is configured to provide a pulse at the node 232 sufficient to drive the transducer 224 to ultrasound oscillation. The transducer 224 is similarly configured to receive ultrasound signals reflected back from an object and convert the echo pulses into echo signals that are then fed into receiver input stage 231 at the node 234.

The system 200 further includes a diode bridge 202 coupled across node 232 which, in conjunction with the diode limiter 214, acts to decouple the receiver and transmitter by alternately grounding nodes 232 and 234. A DC bias current source 212 is coupled across the diode bridge at the nodes 250 and 251. The diode bridge 202 and current source 212 thus embody the non-linear impedance Z2 of FIG. 3a. The diode bridge 202 includes a diode 206 having an anode at the node 250 and a cathode at the node 232. A diode 204 has an anode also coupled to the node 250 and a cathode coupled to ground. A diode 208 has an anode coupled to the node 232 and a cathode coupled to the node 251. Similarly, a diode 210 has an anode coupled to ground and a cathode coupled to the node 251. The diode bridge 202 may be thought of as representing a regular full wave rectifier bridge with AC leads connected to the node 232 and ground, respectively. The diode bridge 202 may be a matched diode bridge (i.e., four diodes on a common chip) to ensure a more uniform biasing.

The circuit 200 is configured such that the node 232 and the node 234 are alternatingly grounded to couple and decouple the transmitter and receiver. During transmission, when the transmitter voltage rises to a level exceeding about plus or minus 1.4 volts, the node 234 is grounded by the diodes 216 and 218 of the diode limiter 214, thereby decoupling the receiver. The node 232 is in conductive connection to the transmit output stage 201 via the diodes 226 and 228, respectively. If the transmit voltage (i.e., the voltage at node 232) rises to a sufficiently high level, the DC bias current from the current source 212 will flow completely through the diode 204 to ground and return through the diode 226 and the diode 208. Similarly, if the transmit voltage at the node 232 is sufficiently negative, the DC bias current from current source 212 will flow via the diode 206, the diode 228, the voltage source 230, and the diode 210.

An equivalent circuit showing transmission operation of the circuit 200 is shown in FIG. 7a. The transmit signal source 230 produces a voltage of sufficient magnitude to cause the diode 226 and the diode 216 to conduct. These are represented in FIG. 7a as short circuits. No potential exists across the node 234 and ground; diodes 204 and 208 are conducting. Thus, the circuit is loaded by current source 212. However, this is only about 1% of the maximum current to be provided by the transmit stage for driving the transducer. The transmit voltage is then provided to the transformer 222 which drives the transducer 224. Since the diode 216 is conducting, the receive stage is effectively decoupled.

During reception, the transmitter 201 is at zero output voltage and thus only small voltages occur across the primary winding of the transformer 222. The diodes of the diode limiter 214 are nonconducting and thus represent a high impedance at the node 234. Similarly, the diodes 226 and 228 are nonconducting and therefore decouple the transmit voltage source 230 from the node 232. The node 232 is grounded by the diodes of the diode bridge 202, which each carry a bias current of half the current supplied. No further conductivity between node 232 and ground will occur.

An equivalent circuit of receive operation is shown in FIG. 7b. The transmit source 230 is at zero volts, and one-half of the source current flows across each of the diodes of the diode bridge. Accordingly, the node 232 is at zero potential (shown as grounded in FIG. 7b), and the transmit source 230 is decoupled. Since the diode limiter 214 is at high impedance (i.e., the diodes 216 and 218 are non-conducting), the transducer can drive the receiver amplifier 220.

Since the DC bias current flow is continuous, no switching transients can occur and a quick recovery time after a transmitted pulse results. The current loading of the transmitter during the transmit phase remains constantly small under all circumstances. That is, the current does not increase even if the transmitter is driven to its maximum positive or negative output levels. Similarly, the receiver input voltage is limited to a constant value of about 1.4 volts peak to peak during the transmission phase. This voltage does not appreciably increase even if the transmitter stage is driven to its maximum positive or negative output levels. As noted above, the transformer 222 may be a step-up transformer (e.g., a 2:1 step-up transformer) such that high transmitter pulses can be generated at the transducer with reasonably low supply voltages for the transmitter stage 201.

Figure 8:
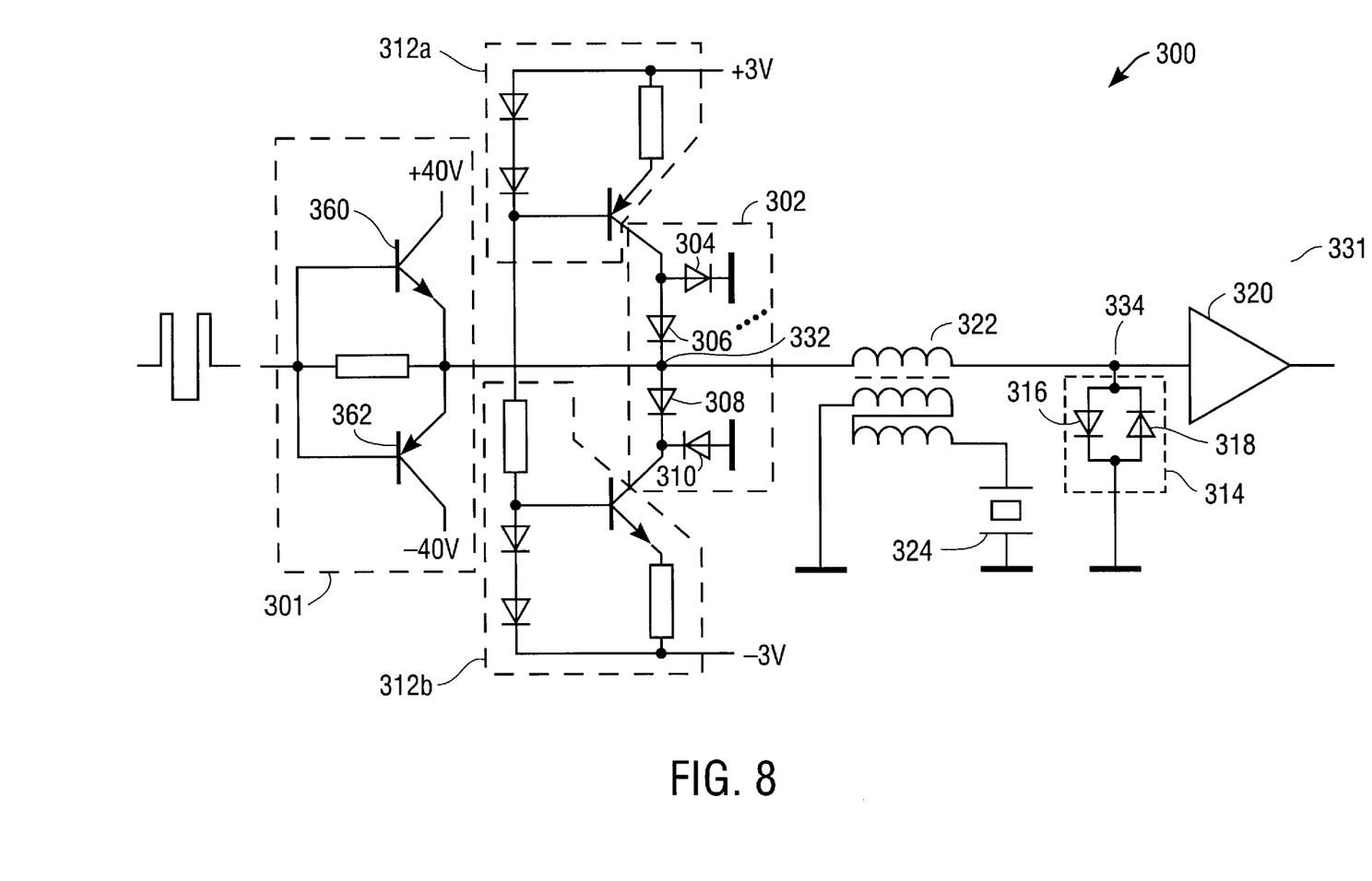
FIG. 8 is a diagram of another exemplary embodiment of the transmit/receive circuit of FIGS. 4b.

An exemplary implementation of the circuit 200 of FIG. 6 is shown in FIG. 8. The circuit of FIG. 8 is similar to that in FIG. 6 in that a transducer 324 is coupled to a winding of a transformer 322. The primary winding of the transformer 322 is coupled to a node 334 at a receiver input stage 331. The receiver input stage 331 includes a preamplifier 320 and a diode limiter 314 embodying the non-linear impedance Z1. The diode limiter 314 includes a pair of oppositely directed diodes 316, 318. The primary winding of the transformer 322 is further coupled to a node 332. Again, the transformer may be omitted in cases in which the transducer is floated. The transformer 322 may be a step-up transformer or an auto-transformer.

The node 332 is coupled to receive an output from a transmit output stage 301. The transmit output stage 301 is implemented as a non-biased complementary emitter follower. In this implementation, the internal base emitter junctions of the emitter follower transistors 360, 362 provide the same function as the diodes 226, 228 of FIG. 6 (i.e., non-linear impedance Z3 of FIG. 3a), which thus are omitted. The idealized floating DC bias current source 212 of FIG. 6 is replaced with two single-ended current sources 312a and 312b. Finally, as in FIG. 6, a diode bridge 302 is coupled across the node 332. Again, the diode bridge 302 and the current sources 312a, 312b implement the non-linear impedance Z2.

As in the circuit of FIG. 6, during transmit operation, the transmit voltage from the complementary current emitter circuit 301 rises to a sufficient level to cause current from current sources 312a, 312b to flow through the diodes 304 and 308, thereby loading the transmitter circuit. The diode 316 is in conduction, so the node 334 is effectively grounded, thereby decoupling the receive amplifier 320. The complementary common-emitter circuit 301 thus drives the transducer 324.

However, during receive operation, the source voltage from the complementary common-emitter circuit 301 is zero volts, and the diode bridge 302 operates to ground the node 332. More particularly, as in the case of the circuit 200 of FIG. 6, half the source current is provided to each of the diodes of the diode bridge 302. The diode limiter is at high impedance and the echo signals from the transducer 324 can drive the receiver.

It is noted that in the embodiment of FIG. 8, the upper and lower current sources 312a, 312b should be matched relatively well, or else a differential current will cause an offset voltage in the transmitter stage. However, this problem may be largely overcome through the use of a pair of current mirrors 412a, 412b, shown in FIG. 9.

Figure 9:
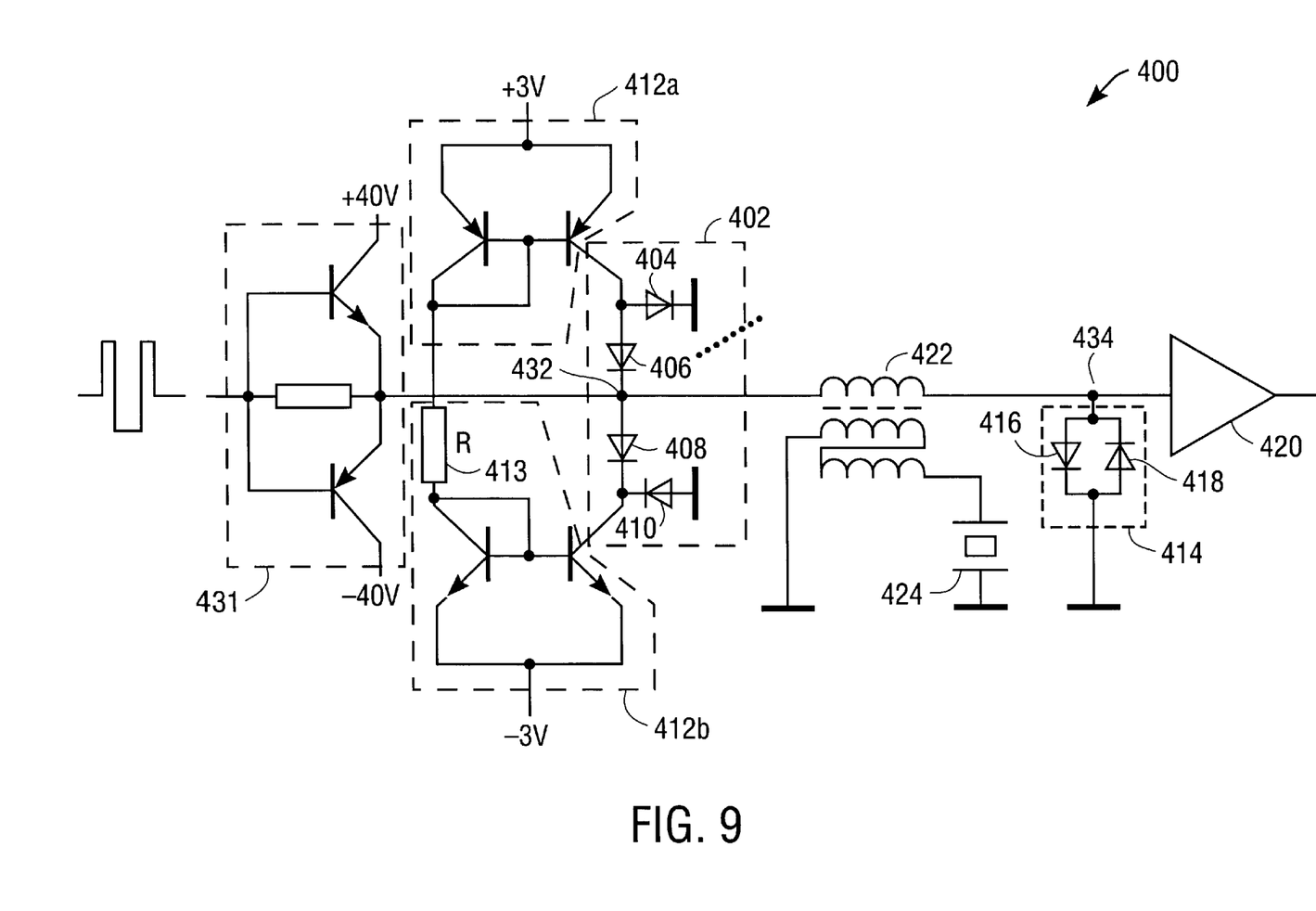
FIG. 9 is a diagram of another exemplary embodiment of the transmit/receive circuit of FIGS. 4b.

It is noted that the embodiment of FIG. 9 is identical to that of FIG. 8, except that the upper and lower current sources 312a, 312b are replaced with the upper and lower current mirrors 412a, 412b, respectively. As is well known, the current provided is regulated by choice of the resistor 413. Operation of the circuit 400 is thus similar to that for the embodiment of FIG. 8: During transmit operation, the transmit voltage from the complementary current emitter circuit 431 rises to a sufficient level to cause current from current mirrors 412a, 412b to flow through the diodes 404 and 408, thereby loading the transmitter circuit. The diode 416 is in conduction, so the node 434 is effectively grounded, thereby decoupling the receive amplifier 420. The complementary common-emitter circuit 431 thus drives the transducer 424. During receive operation, the source voltage from the complementary common-emitter circuit 431 is zero volts, and the diode bridge 402 operates to ground the node 432. The diode limiter 414 is at high impedance and the echo signals from the transducer 424 can drive the receiver.

Figure 10:
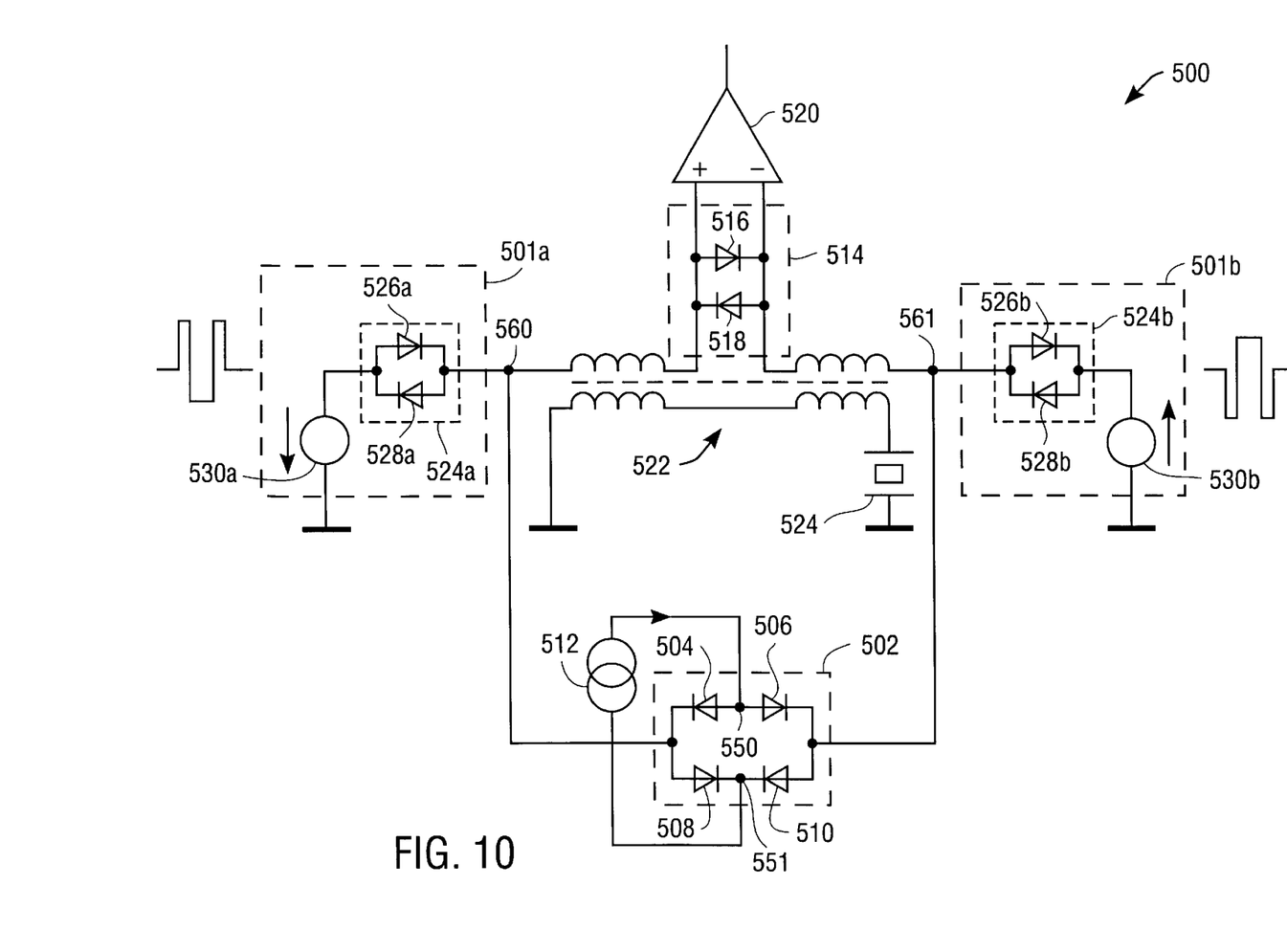
FIG. 10 is a diagram of an ultrasound transmit/receive stage according to another embodiment of the present invention.

Turning now to FIG. 10, a diagram of a balanced-to-ground transmit/receive input circuit 500 is illustrated. Compared to the unbalanced-to-ground configuration of FIG. 6, the required power supply voltages for the transmit stages can be halved or, alternatively, with the same power supply voltages, the transforming ratio of the transformer can be halved.

The transmit/receive circuit 500 includes a common transformer 522 and a transducer 524 coupled to a secondary winding. A first transmit stage 501a is coupled to a first primary winding of the transformer 522. A second transmit stage 501b is coupled to a second primary winding of the transformer 522. The first and second transmit stages include diode limiters 524a and 524b, which implement the non-linear impedance Z3. The transformer 522 may be embodied as a step-up transformer.

A receive stage, including a diode limiter 514 (embodying non-linear impedance Z1) and a differential preamplifier 520, is further coupled across the primary windings of the transformer 522. A diode bridge 502 is coupled across the transformer at nodes 560 and 561. The diode bridge 502 is configured such that the cathodes of diodes 508 and 510 couple at a node 551 to a current source 512. The anodes of diodes 504 and 506 couple at a node 550 to the current source 512 as well. The cathode of diode 504 and the anode of diode 508 are coupled together and to node 560. The cathode of diode 506 and the anode of diode 510 are similarly coupled to one another and to node 561. Again, the diode bridge and current source function as the non-linear impedance Z2.

As in the unbalanced-to-ground implementation, the diode circuit 514 and the diode bridge 502 act to couple and decouple the transmitters from the receiver. During transmit operation, when the transmit voltage reaches a sufficiently high level, the transmit current flows either from the transmitter source 530a through the diode 526a, the first primary winding of the transformer 522, the diode 516, the second primary winding of the transformer 522 and the diode 528b to the second transmitter source 530b, or vice versa (via diodes 526b, 518 and 524a), depending upon the polarity of the transmitted pulse. Again, the diode bridge 502 represents a high impedance between the nodes 560 and 561 since the DC bias current from the DC bias current source 512 flows either through diodes 506, 508 or through diodes 504, 510 depending upon the actual transmit pulse polarity. Though the current source 512 loads the circuit, the current is relatively small compared to the transmit current used to drive the transducer 524.

Figure 11A:
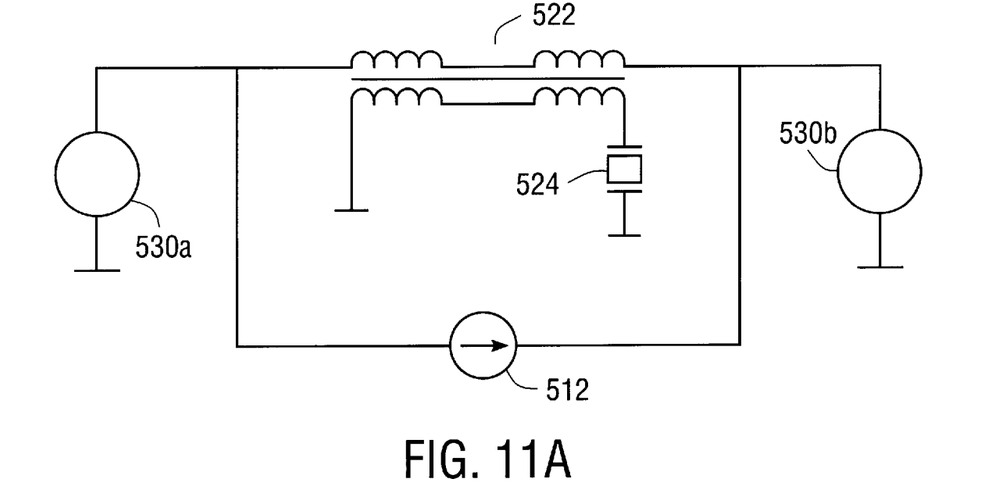
FIG. 11a and FIG. 11b are equivalent circuits of the transmit and receive operation of the transmit/receive circuit of FIG. 10.

An equivalent circuit showing transmit operation is illustrated in FIG. 11a. The transmit signal sources 530a, 530b, drive the circuit via the diodes 526a, 528b or 526b, 528a, depending on the polarity of the pulse. Accordingly, these are shown in FIG. 11a as short circuits. The current source 512 provides current to diodes 506, 508, or diodes 504, 510. Again, these are shown in FIG. 11a as short circuits. Finally, the diodes 516, 518 are conducting and, again, are shown as short circuits. The transmit circuits 530a, 530b thus effectively drive the transducer 524.

During receive operation, both transmit stages 501a and 501b are at zero potential and, accordingly, the diodes 526a, 528a, 528b and 526b are in a high impedance state. Due to the DC bias current from the DC bias current source 512, the diodes 504, 506, 508 and 510 of the diode bridge 502 are conducting so that node 560 is coupled to node 561. The diodes 516 and 518 are nonconducting since the receive amplitudes are sufficiently small. The transducer 524 thus drives the receiver. Noise introduced by the DC bias source will not impair the receive signal quality since it is cancelled out in the differential preamplifier 520.

Figure 11B:
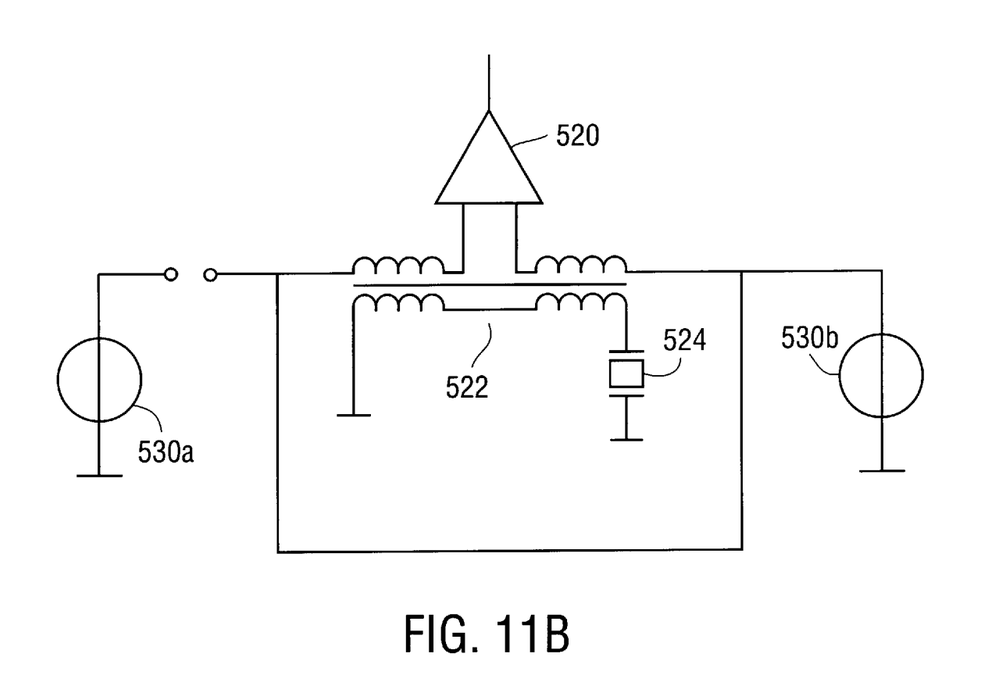

An equivalent circuit showing receive operation is shown in FIG. 11b. The transmit sources 530a, 530b provide no potential. The diode pairs 524a, 524b are nonconducting and therefore decouple the transmit voltages sources 530a, 530b. The diode bridge 502 thus provides no potential across nodes 560, 561. Received echo signals are provided from the transducer 524 to the receive amplifier 520.

Figure 12:
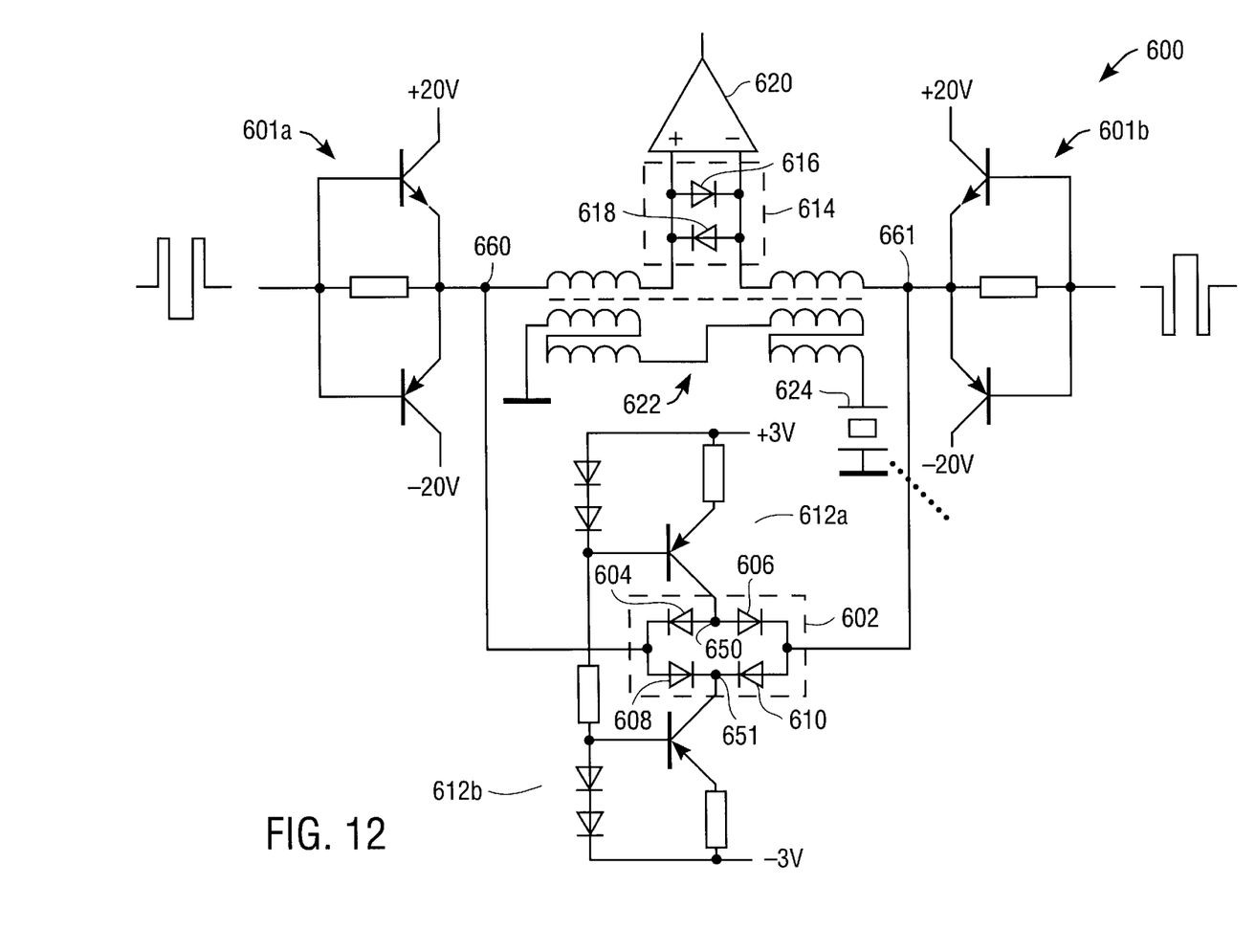
FIG. 12 is a diagram of an exemplary embodiment of the transmit/receive circuit of FIG. 10.

Turning now to FIG. 12, an exemplary embodiment of the circuit of FIG. 11 is shown. The transmitter stages 501a, 501b of FIG. 11 are replaced with the complementary common emitter circuits 601a and 601b. Again, the use of the complementary emitter follower stages 601a and 601b means that the diode circuits 524a and 524b of FIG. 11 may be omitted since the internal base emitter paths of the emitter follower current sources provide the same function (i.e., that of non-linear impedance Z3). Additionally, the idealized current source 512 of FIG. 11 is replaced with upper and lower current sources 612a, 612b. Otherwise, however, the circuits are similar. A transducer 624 is provided at one lead of a winding of a transformer 622. A pair 614 of diodes 616, 618 are provided across the inputs of a differential amplifier 620, whose inputs are coupled to the primary windings of the transformer 622. The primary windings of the transformer 622 are further provided to the complementary common emitter circuits 601a, 601b, as well as to nodes of the diode bridge 602. The transformer may be, for example, a step-up transformer.

During transmit operation, the transmit voltage from the complementary current emitter circuits 601 a, 601b rises to a sufficient level to cause current from the current sources 612a, 612b to flow through the diodes 606 and 608, thereby loading the transmitter circuit. One of the diodes 616 or 618 is in conduction, so the receiver amplifier 620 is decoupled. The complementary common-emitter circuits 601a, 601b thus drive the transducer 624.

During receive operation, the source voltages from the complementary common-emitter circuits 601a, 601b are zero volts, and the diode bridge 602 operates to ground the nodes 660, 661. More particularly, as in the case of the circuit 500 of FIG. 11, half the source current is provided to each of the diodes of the diode bridge 602. The diode limiter 614 is at high impedance and the echo signals from the transducer 624 can drive the receiver.

Figure 13:
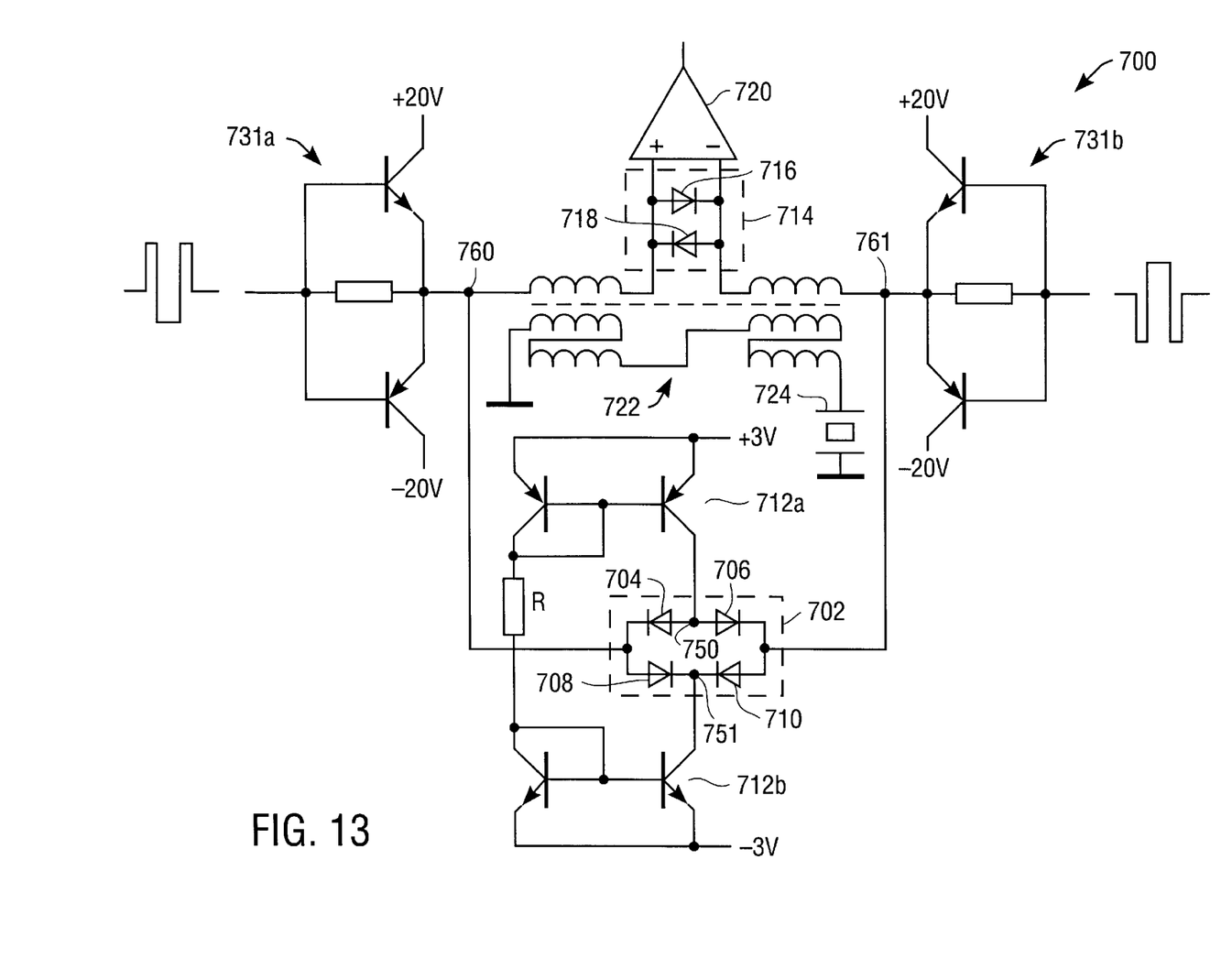
FIG. 13 is a diagram of another exemplary embodiment of the transmit/receive circuit of FIG. 10.

Again, however, difficulties can arise if the upper and lower current sources 612a and 612b are not adequately matched. Accordingly, the upper and lower current sources 612a and 612b are replaced in the embodiment of FIG. 13 with upper and lower current mirror circuits 712a and 712b. Operation of the circuit 700 is thus identical to that for the embodiment of FIG. 12: During transmit operation, the transmit voltage from the complementary current emitter circuits 731a, 731b rises to a sufficient level to cause current from the current mirrors 712a, 712b to flow through the diodes 706 and 708, thereby loading the transmitter circuit. The diode 716 or the diode 718 is in conduction, so the receive amplifier 720 is decoupled. The complementary common-emitter circuits 731a, 731b thus drive the transducer 724. During receive operation, the source voltage from the complementary common-emitter circuits 731a, 731b is zero volts, and the diode bridge 702 operates to interconnect the nodes 760, 761. The diode limiter 714 is at high impedance and the echo signals from the transducer 724 can drive the receiver.

The invention described in the above detailed description is not intended to be limited to the specific form set forth herein, but, on the contrary, is intended to cover such alternatives, modifications and equivalents as can reasonably be included within the spirit and scope of the appended claims.

We claim:

1. A circuit, comprising:
   at least one transducer;
   an output node for providing an output signal to said transducer;
   an input node configured to receive an input signal from said at least one transducer; and
   a transformer having a first winding coupled between said input node and said output node, wherein said input node and said output node are configured to be alternatingly grounded, and wherein said at least one transducer is coupled between a terminal of a second winding of said transformer and ground.

2. A circuit according to claim 1, further comprising a diode bridge coupled to said output node.

3. A circuit according to claim 2, further comprising a current source coupled to provide current to a node connecting the anodes of a first diode of said diode bridge and a second diode of said diode bridge.

4. A circuit according to claim 3, wherein a cathode of said second diode and an anode of a third diode are coupled to said output node.

5. A circuit according to claim 3, wherein said current source is a current mirror.

6. A circuit according to claim 1, further comprising a transmit stage coupled to said output node, said transmit stage configured to excite the at least one transducer.

7. A circuit according to claim 6, wherein said transmit stage comprises a pair of oppositely-parallel diodes coupled to said output node.

8. A circuit according to claim 1, further comprising a diode limiter coupled to said input node.

9. A circuit according to claim 1, wherein said transmit stage includes a complementary common emitter circuit.

10. A circuit according to claim 1, wherein said transformer is a step-up transformer.

11. A circuit according to claim 1, wherein said transformer is an autotransformer.

12. An ultrasound imaging device comprising:
    at least one transducer;
    at least one receiver coupled to receive signals from said at least one transducer;
    at least one transmitter coupled to provide excitation signals to drive said transducer; and
    a transmit/receive circuit coupling said transducer, said transmitter, and said receiver, said transmit/receive circuit including:
      an output node for providing an output signal from said transmitter said transducer;
      an input node configured to receive an input signal from said at least one transducer and provide said input signal to said receiver;
      a transformer having a primary winding coupled between said output node and said input node and a secondary winding, wherein said at least one transducer is coupled between said secondary winding and ground.

13. An ultrasound imaging system according to claim 12, wherein said isolating means includes a diode bridge coupled to said output node.

14. An ultrasound imaging system according to claim 13, wherein said transmitter includes a pair of oppositely-parallel diodes coupled to said output node.

15. An ultrasound imaging system according to claim 13, further comprising a current source coupled to provide current to a node connecting the anodes of a first diode of said diode bridge and a second diode of said diode bridge.

16. An ultrasound imaging system according to claim 15, wherein said current source is a current mirror.

17. An ultrasound imaging system according to claim 15, wherein a cathode of said second diode and an anode of a third diode are coupled to said output node.

18. An ultrasound imaging system according to claim 12, wherein said isolating means includes a diode limiter coupled to said input node.

19. An ultrasound imaging system according to claim 12, wherein said transmitter includes a complementary common emitter circuit.

20. An ultrasound imaging system according to claim 12, wherein said transformer is a step-up transformer.

21. An ultrasound imaging system according to claim 12, wherein said transformer is an auto-transformer.

22. A circuit, comprising:

an ultrasonic transducer;

an output node for providing an output signal to said transducer;

an input node configured to receive an input signal from said at least one transducer; and means for alternatingly grounding said input node and said output node, wherein said ultrasonic transducer is coupled between said input node and said output node.

23. A circuit, comprising:

at least one transducer;

a first stage coupled to an output node for providing an output signal to said at least one transducer;

a second stage coupled to an input node configured to receive an input signal from said at least one transducer; and a first nonlinear impedance coupled to said input node, wherein said first stage and said second stage are configured to be alternatingly isolated, and wherein said at least one transducer is coupled between said input node and said output node.

24. A circuit according to claim 23, wherein said first nonlinear impedance is a diode limiter coupled to said input node.

25. A circuit according to claim 23, wherein said first stage comprises a second nonlinear impedance.

26. A circuit according to claim 25, wherein said second nonlinear impedance comprises a pair of oppositely-parallel diodes coupled to said output node.

27. A circuit according to claim 26, further including a third nonlinear impedance coupled at said output node.

28. A circuit according to claim 27, wherein said third nonlinear impedance includes a diode bridge.

29. A circuit according to claim 28, further comprising a current source coupled to provide current to a node connecting the anodes of a first diode of said diode bridge and a second diode of said diode bridge.

30. A circuit according to claim 29, wherein a cathode of said second diode and an anode of a third diode are coupled to said output node.

31. A circuit according to claim 29, wherein said current source is a current mirror.

32. A circuit according to claim 23, wherein said first stage includes a complementary common emitter circuit.

33. A circuit according to claim 23, further comprising a transformer having a primary winding coupled between said output node and said input node, and a secondary winding, wherein said at least one transducer is coupled to a terminal of said secondary winding.

34. A circuit according to claim 33, wherein said transformer is a step-up transformer.

35. A circuit according to claim 34, wherein said transformer is an auto-transformer.

* * * * *